Nov. 29, 1966 R. T. CLEARY ET AL 3,288,932
VOICE-DATA SUBSTATION APPARATUS ACTUATED BY TONE FROM
CENTRAL SWITCHING OFFICE
Filed April 24, 1963 2 Sheets-Sheet 1

INVENTORS
Robert T. Cleary
Robert V. Burns
BY
[signature]
ATTY.

INVENTORS
Robert T. Cleary
Robert V. Burns
BY
C. A. Gullbrandsen
ATTY.

United States Patent Office 3,288,932
Patented Nov. 29, 1966

3,288,932
VOICE-DATA SUBSTATION APPARATUS ACTUATED BY TONE FROM CENTRAL SWITCHING OFFICE

Robert T. Cleary, Lockport, and Robert V. Burns, Markham, Ill., assignors to Automatic Electric Laboratories, Inc., Northlake, Ill., a corporation of Delaware Filed Apr. 24, 1963, Ser. No. 275,373
3 Claims. (Cl. 179—2)

This invention relates to data transmission systems and in particular to substation apparatus for controlling voice-data transmission.

Systems have been designed in which data can be transmitted at a low speed or at a high speed. Systems have also been designed to handle a large amount of data transmission traffic, for example the broadband data switching system described by F. B. Sikorski and K. K. Spellnes in their copending patent application Serial No. 244,058, now U.S. Patent 3,266,488, entitled "Data Switching System," and assigned to the same assignee as the present invention. Heretofore the operators of such systems were required to control the transmission of data by simultaneous actions at both end stations, that is simultaneously operating controls and push buttons. Furthermore, if some question should arise at one of the data transmitting stations with regard to the data being transmitted, for example a suspicion of faulty or garbled data, the operator would have to resort to other apparatus, such as a telephone, to confirm these suspicions with the operator at the other station. This would be a very time consuming and bothersome way of monitoring the data transmission. It is therefore the object of the invention to provide a new and improved data transmission control system.

It is a further object of the invention to provide improved substation apparatus employing both the principles of telegraphy and telephony for better control of data transmission.

Since the substation apparatus described herein employs multi-frequency addressing, it is a particular object of the invention to provide the substation apparatus with means for preventing the handset transmitter from responding to background noise and the like to cause the switching center to address a wrong subscriber substation.

Other objects of the invention and the features not specifically set forth will become apparent and the invention will best be understood from the following description and the accompanying drawings.

In the description below certains terms will be used which are self-explanatory. However, these terms will be defined as follows:

A. Disconnect mode. This mode of operation (or inoperation) that is similar to a telephone subset that is on hook. There is no communication.

B. Voice mode. The voice mode of operation is the condition in which only voice communication can take place.

C. Data mode. The data mode of operation is the condition in which only data communication can take place.

In general the substation is interposed between the subscriber data processing machine and the switching center. It enables the subscriber to call up the desired party and permits the exchange of voice as well as data intelligence. All answer, disconnect, address, re-ring signalling of the called or calling party and selection of voice or data mode functions are accomplished at the substation. The substation is designed for use with a broadband system and includes a standard 4-wire telephone handset.

Figure 1:
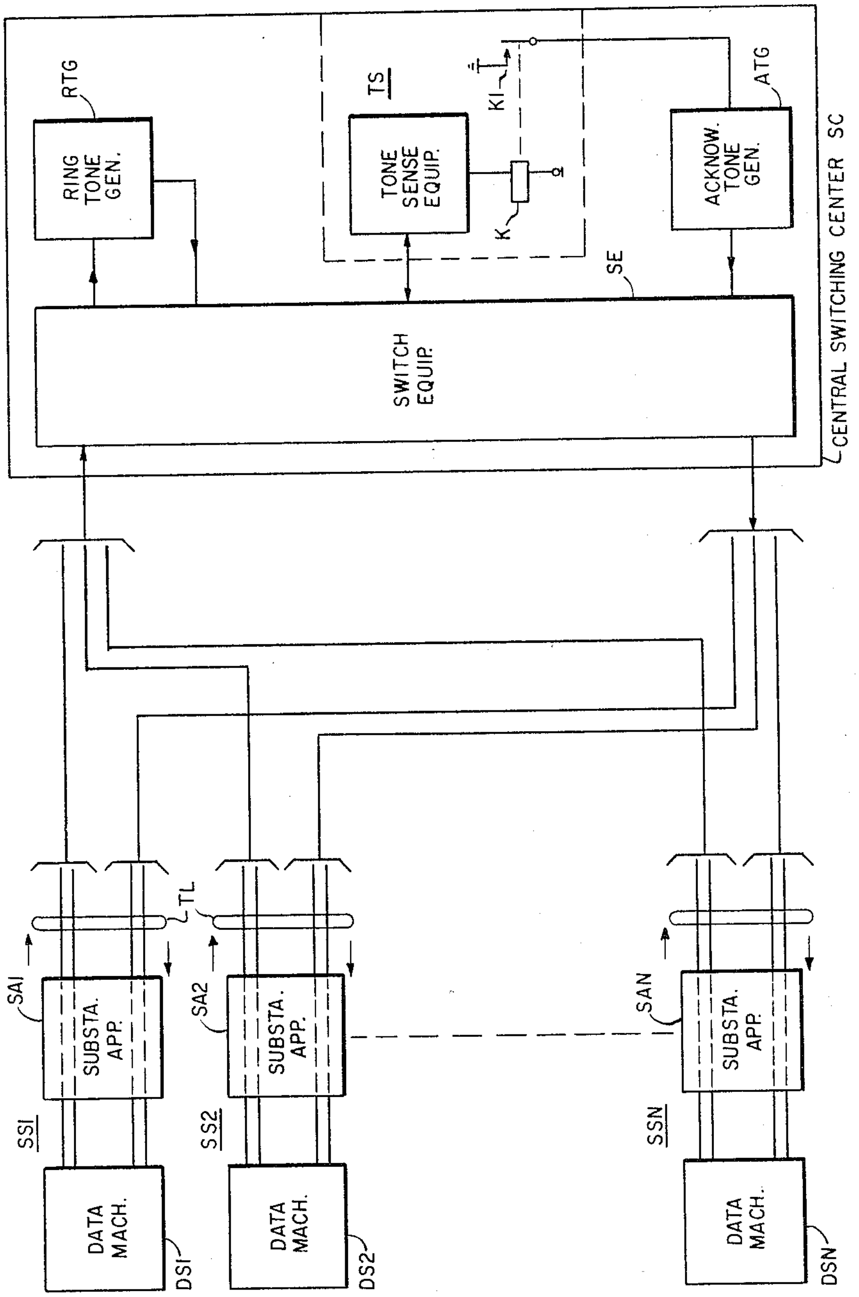
FIG. 1 is a block diagram representation of a data transmission system having a central switching center and a plurality of subscriber substations associated with said switching center.

Referring to FIG. 1, a simplified data transmission system is shown having a central switching center SC and a plurality of outlying subscriber substations SS1 to SSN. The switching center SC is similar in many respects to the well known telephone central office and includes switching equipment SE which is capable of selectively accessing and connecting the substations according to a tone address. The switching center SC further includes a ringing tone generator RTG for signalling a called substation, and an acknowledgment tone generator ATG for signalling a calling party as will be described below. The switching center also includes tone sensing equipment TS for triggering the acknowledgment tone generator. This equipment, including relay K, may be similar to the arrangement disclosed by R. E. Stoffels in his United States Patent 3,076,056, issued January 29, 1963, wherein "go ahead" signal tones are transmitted from a called to a calling station when said called station has been accessed. The tone sensing equipment could also contain apparatus that is well known in the art for counting the tone digits and determining when an address is completed.

Each of the subscriber stations includes substation apparatus, such as SA1, and some type of data set, for example DS1. The associated substation apparatus and data set are interconnected by at least transmitting and receiving lines and the subscriber substation is further connected by the transmission line TL to the central switching center SC. It should be noted that other network configurations, such as trunking, carrier applications and the like may also be used and FIG. 1 is mainly for a simplified explanation of the invention. Assume for purpose of illustration, that any subscriber substation may access any other subscriber substation through the switching center. The switching center SC may also contain toll ticketing apparatus and other special equipment which are well-known and need not be described.

Figure 2:
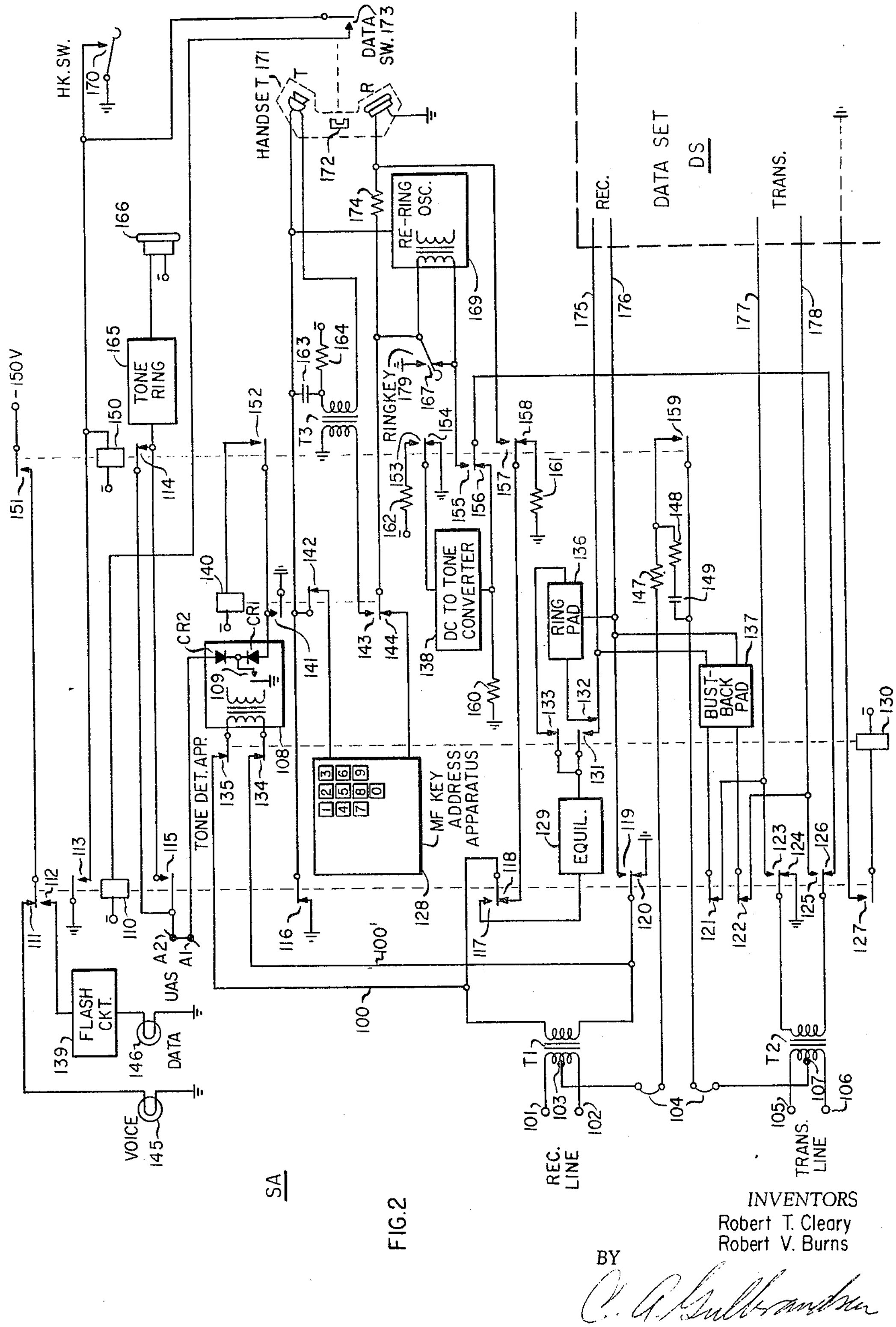
FIG. 2 is a schematic representation of an embodiment of the invention showing substation apparatus and a data set which may be employed in any of the subscriber substations of FIG. 1.

Referring to FIG. 2, substation apparatus SA is shown which enables a data set DS to transmit and receive information in a 4-wire transmission system. The substation apparatus SA includes controls and indicators such as the voice lamp 145, data lamp 146, hook switch 170, data switch 173, and a key set of the multi-frequency key set address apparatus 128. Also shown are relays 110, 130, 140 and 150 which in general are operable under the control of one or more of the above controls. Further included in the substation apparatus SA are the flashing circuit 139, electronic tone ringer 165, D.C. to tone converter 138, tone detector apparatus 108, a ring key 179, re-ring oscillator 169, equalizer 129, ring pad 136 and bust-back pad 137.

1.0 CONTROLS AND INDICATORS

The following descriptions of the controls and indicators are given to establish a practical operating concept of the substation apparatus.

1.1 *Ring key 179.*—This control permits a subscriber to re-ring the party at the opposite end of the line. If for some reason, for example, the reception of faulty or garbled data, the customer wishes to signal the party at the other end of the line, he lifts the handset to revert the subset to the voice mode and depresses the ring key. This causes the electronic tone ringer 165 of the other party's substation apparatus to sound. This key or push button is enabled only when in the voice mode. The ring key does not function to re-ring while the subset is transmitting data.

1.2 *Volume control.*—A small wheel projects through the bottom of the substation apparatus and facilitates adjustment of the electronic ringer volume level. The volume control, considered a part of the electronic ringer, is not shown in the drawings.

1.3 *Voice lamp 145.*—This lamp, when lighted, indicates that the substation is in the voice mode and that voice communication may take place.

1.4 *Data lamp 146.*—This lamp, when flashing, indicates that the substation is conditioned to allow the reception and transmission of data between subscriber's data processing machines. Both of these lamps (voice and data) will never be lighted simultaneously.

1.5 *Hook switch (contact 170).*—The hook switch for the handset 171 is located in a handset well in the subset base. Removal of the handset 171 from this cradle conditions the substation to the voice mode and causes the voice lamp to be lighted. Conversely, the replacing of the handset 171 results in a disconnect just as with a regular telephone.

1.6 *Data switch (contact 173).*—In order to condition the substation for data transmission, the handset 171, after voice coordination, or at least after reaching the desired party, is placed on the data pod. A small magnet 172 inside the handset 171 causes contacts 173 of the data switch to make, in turn causing a relay (relay 110) to operate and thereby condition the substation for data transmission.

1.7 *MF key address apparatus 128.*—Instead of the familiar rotary dial, a set of ten push buttons, numbered 1 to 0, project from the substation faceplate to provide for multi-frequency addressing (MF dialing). In multi-frequency addressing, various combinations of two-out-of-five basic frequencies are used to represent digits. By way of illustration only, the following table is offered.

*Digital equivalents of multi-frequency combinations*

| Digits: | Frequencies (c.p.s.) |
|---|---|
| 1 | 700+900 |
| 2 | 700+1100 |
| 3 | 900+1100 |
| 4 | 700+1300 |
| 5 | 900+1300 |
| 6 | 1100+1300 |
| 7 | 700+1500 |
| 8 | 900+1500 |
| 9 | 1100+1500 |
| 0 | 1300+1500 |

Since MF addressing consists of frequencies which are in the audio or voice-frequency range, some provision must be made to disable the handset transmitter T while addressing is taking place. The reason for this is that should there be background noise of the correct frequency and sufficient amplitude at the subscriber's premises while the subscriber is addressing, the switching center equipment may mistake some of the background noise components for address digits and access a wrong number. This condition is commonly known as "talk down." To preclude the possibility of talk down, the handset transmitter T is muted until addressing is completed at which time a signal, say 1200 c.p.s., from the switching center SC enables the transmitter T. A similar burst of enabling tone is sent from the switching center connector to enable the transmitter of the called party when that party removes his handset from his subset.

2.0 DESCRIPTION OF MAJOR COMPONENTS

The following descriptions are offered to give a better understanding as to the general function of each major component of the substation apparatus.

2.1 *Tone addressing apparatus 128.*—The tone addressing circuit provides the five frequencies used for MF addressing (1.7) and may include five individual oscillators, a code conversion matrix and a line amplifier. The oscillators provide the standard MF code frequencies, such as noted in the above table. A code conversion matrix connects the oscillators in a two-out-of-five manner to the line amplifier which amplifies the combined frequencies to the necessary output level for transmission to the switching center.

2.2 *Tone detecting apparatus 108.*—This apparatus is used to detect the presence of a tone, say 1200 c.p.s., on the receive line from the switching center; a guard circuit rejects all other frequencies. When the substation is idle or in the disconnect mode, the detector apparatus 108 triggers the electronic tone ringer 165 to indicate that the subscriber is being called. When the substation apparatus is conditioned to the data mode, the detector apparatus also triggers the tone ringer to indicate that the party on the other end of the line is re-ringing and wishes to return the voice mode. When the substation is in this voice mode, the detector apparatus operates a relay (relay 140) to enable the transmitter T in the handset 171. This apparatus may include such circuitry as an audio amplifier, emitter followers and associated components which provide the proper feedbacks for stability, temperature compensation, and protection from line transients.

2.3 *Electronic tone ringer 165.*—The electronic ringer produces a modulated tone when triggered by the tone detector apparatus 108; this tone, of course, is unlike that of the standard bell ringer. A telephone receiver is employed as a transducer 166 to convert the electronic signal from the output oscillator to an audible tone. This electronic tone ringer preferably consists of a modified Colpitts oscillator having a resonant frequency of approximately 2000 c.p.s. An inductance-capacitance network blocks the tone output at, say 12 c.p.s., thus producing a distinctive ringing tone.

2.4 *Re-ring oscillator apparatus 169.*—When the distant party's substation is in the data mode, this apparatus permits the local party to signal the distant party to return to the voice mode. This is accomplished by depressing the ring key 179. The tone from the re-ring apparatus 169 is sent to the distant party's substation. Upon the receipt of this tone, the tone detector apparatus of the distant party is triggered enabling the ringer of that substation. The oscillator of the re-ring apparatus would have a frequency corresponding to the detectible frequency of the tone detector apparatus, say 1200 c.p.s.

2.5 *Equalizer 129.*—The equalizer corrects the uneven frequency response which is due to the attenuation of higher frequencies on transmission circuits. The equalizer circuit is to be used on an "as required" basis.

2.6 *Ring pad 136.*—The ring filter circuit functions to attenuate the ringing tone frequencies so as to prevent them from accidentally starting the data processing machine upon receipt of a re-ring signal.

2.7 *Bust-back pad 137.*—The bust-back pad is used when setting up the data machines. This pad serves to drop the input from the data machine transmitter to the data machine receiver to achieve a realistic data-input level.

2.8 *D.C. to tone converter 138.*—The D.C. to tone converter is used only when single frequency supervision between the subscriber subset and the switching center is required. This converter transmits a continuous tone toward the switching center at all times that the subset is idle. When the handset is lifted, the tone is removed; in this manner, on hook, off hook supervision is achieved.

2.9 *Power supply.*—The power supply includes provision for low voltage unregulated and regulated potentials. The unregulated supply furnishes, for example, −18 volts for operation of relays, and the regulated supply furnishes, for example, −12 volts for the electronic circuitry. A −15 volt supply may be used for biasing purposes. A high voltage, say —150 volts, is used to supply the D.C. voltage for the neon indicator lamps 145, 146. Also included is the flashing circuit 139 which is used to flash the data lamp 146 when the substation is in the data mode.

3.0 SWITCHING CENTER AND DATA MACHINES

In order to give a clear description of the substation apparatus and its operation, it is first necessary to briefly describe the switching center and the data machines which are to be used in such a system.

3.1 *Switching center SC*.—The switching center must of course be capable of handling two-way data and voice transmission. Furthermore, the switching center must also be able to detect the address signals from a calling party; use the above detected signals to access the corresponding called party; and supply the calling or called party with proper tone signals, such signals being initially requested or instigated by either of the parties.

A system of this type is generally described in the above-mentioned U.S. patent application Ser. No. 244,058, now U.S. Patent 3,266,488.

3.2 *Data machines*.—A data machine associated with any particular substation apparatus may be any of several well-known types. The data machine must however be capable of performing certain functions as will be described below.

4.0 IDLE LINE TERMINATION AND OFF-HOOK SUPERVISION

When in the disconnect mode, the substation apparatus SA has two types of on-hook off-hook supervision circuits.

4.1 *Receiving circuit termination*.—Terminals 101 and 102 form the input to the receiving circuit and are connected to the primary winding of transformer T1. From the secondary of transformer T1 the receive circuit may be traced up from the secondary of transformer T1 to the right through closed contact 118 of relay 110 through the closed contact 158 of relay 150, resistance 161, to ground, and on the bottom side of the secondary of transformer T1 down and to the right through the closed contact 120 of relay 110 to ground. Resistance 161 serves as the receiving circuit idle-line termination. Because of the impedance transformation ratio, says 4:1, of transformer T1, resistance 161 will appear as 600 ohms at the input former by terminals 101 and 102 if the actual resistance of resistance 161 is 150 ohms. Transformer T1 also serves as the source for the tone detector as will be discussed below.

4.2 *Transmitting circuit termination*.—The output of the transmitting circuit is connected to the transmission line at terminals 105 and 106, the secondary of transformer T2. The primary of transformer T2 is connected on the one hand through the normally closed contact 124 of relay 110 to ground and on the other hand through the normally closed contact 126 of relay 110 through the normally closed contact 156 of relay 150 and through resistance 160 to ground. Like resistance 161, resistance 160 represents the idle-line termination for the transmitting circuit and is transformed to 600 ohms at terminals 105 and 106, if the transformation and impedance are the same as for the above receiving circuit.

4.3 *Idle-line termination release*.—The idle-line termination release is the same whether an orignating or terminating call is involved. In both instances the handset 171 is removed from the hook switch closing the hook switch contacts 170, thus energizing relay 150. Relay 150 operates and pulls all its contacts. The receiving line termination is removed when the break-make contacts 157–158 operate; the transmitting termination is removed when break-make contacts 155–156 operate. This, however, is only a substitution action. Resistance 160 and 161 are replaced by circuit components having similar impedances. If a station is provided with an unattended answering service (UAS), connected to terminals A1 and A2 and the strap therebetween removed, the UAS equipment will initiate the action by operating relay 150.

4.4 *On-hook off-hook supervision circuits*.—The substation apparatus is capable of two types of supervision: simplex D.C. and single frequency supervision.

4.4.1 *Simplex D.C. supervision*.—A D.C. path between the receiving and transmitting line-pairs informs the switching center that an off-hook condition exists. This circuit may be traced from the terminals 101 and 102 through the primary winding of transformer T1, terminal 103, through the upper strap 104, resistance 147, to the contact 159 of relay 150. On the transmitting line side the simplex supervision may be traced from terminals 105 and 106 through the secondary winding of transformer T2, terminal 107, through the lower strap 104, through to the contact corresponding to contact 159 of relay 150. This D.C. path is also opened by capacitor 149. When the substation apparatus goes off-hook, as previously described, and relay 150 operates, the D.C. path is closed at contact 159, signalling the switching office that the station is off-hook.

4.4.2 *Single frequency supervision*.—Single frequency supervision is used on extremely long lines or in conjunction with carrier equipment. A D.C. to tone converter 138 generates a signal, say 1688 c.p.s., which when present on the transmitting line, indicates an on-hook condition. The converter is connected to the transmit line between resistance 160 and contact 156. The converter is also connected through contact 154 of relay 150 to ground. The output during the idle or disconnect mode is from the converter through the normally closed contact 156 of relay 150 through the normally closed contact 126 of relay 110 to the primary of transformer T2 and through the normally closed contact 124 of relay 110 to ground. When the handset 117 is removed from the cradle, the hook switch contacts 170 close and energize relay 110 opening this last-traced circuit at contact 156. Removal of the tone from the line indicates to the switching center that the station apparatus is off-hook.

5.0 DESCRIPTION OF OPERATION

Referring to FIGS. 1 and 2, assume that the subscriber at the subscriber station SS1 wishes to be connected to subscriber station SSN so that there may be an exchange of data between the data sets DS1 and DSN. Assuming that the subscriber at station SS1 is the calling party, first a description will be given for the operation of the substation apparatus SA of FIG. 2 for a calling party.

5.1 *Outgoing call and MF signalling*.—The operator will lift the handset 171 from the cradle closing the hook switch contacts 170 and supplying ground to operate relay 150. Contacts 151, 152, 153, 155, 157 and 159 make, while contacts 114, 154, 156 and 158 break. The closure of contact 151 extends —150 volts through contact 111 of relay 110 to the voice lamp causing it to light. The make action of contact 159 indicates to the switching center that the substation is off-hook and will require service. Note at this time that the closure on contact 152 partially completes the ground side of the circuit for relay 140. There exists at this time a complete output connection between the MF key address apparatus 128 and the transmitting line at terminals 105 and 106. This circuit may be traced from ground through contact 124 of relay 110, secondary winding of transformer T2, contact 126 of relay 110, through contact 155 of relay 150, contact 168, the ring key, contact 144 of relay 140, the MF key address apparatus 128, contact 142 of relay 140 and contact 116 of relay 110. At this time the operator will key the proper address for subscriber station SSN and any other needed addressing, such as the preferred bandwidth for transmission. Once the switching center has received the proper number of digits, an acknowledgment tone is sent back from the switching center to the calling party (schematically indicated in FIG. 1). This tone enters the substation apparatus SA at the receive terminals 101 and 102 and is coupled to the secondary of transformer T1 and by way of connections 100, 100' through the contacts 134 and 135 of relay 130 to the tone detector apparatus 108. This tone causes the contact 109 to make with ground and ground is transmitted to the tone ringer by way of terminals A1, A2 through the contact 115 of relay 110 to the electronic tone ringer 165 enabling the tone ringer and causing the transducer 166 to emit an audible tone indicating that the proper addressing has taken place. The same ground from contact 109 in the tone detector apparatus 108 is also applied to relay 140 through the closed contact 152 of relay 150 energizing relay 140. Relay 140 operates and closes contacts 141 and 143 and opens contacts 142 and 144. The closure of contact 141 supplies a holding ground to relay 140. At this point note that diode CR1 prevents a ground feedback through contact 141 from triggering the tone ringer 165. The opening of contacts 142 and 144 disables the MF key address apparatus 128. The closure of contact 143 makes a complete connection between the transmitter T of handset 171 and the transmission line. The circuit can be traced as follows from the ground at contact 116 of relay 110 to the right and through the handset transmitter T back to the primary winding of transformer T3 and through resistance 164 to battery, the secondary of transformer T3 through contact 143, the ring key, contact 168, contact 155 of operated relay 150, contact 126 of relay 110, primary of transformer T2, contacts 124 of relay 110 to ground. Transformer T2 then couples the output to the terminals 105 and 106 of the transmission line. Of particular interest at this point is the fact that the transmitter T of the handset 171 is not coupled to the transmission line until the proper MF address has taken place and a tone indicating same has been transmitted back to the calling party to enable relay 140 to close on contact 143. This prevents talk down, which could be a major source of false addressing if it were not for such an arrangement.

5.2 *Voice communication.*—Assuming that the called substation, in this case SSN, has answered and is conditioned for voice communication, voice communication may now take place between the two substations over the transmission path just traced for the transmitter T of the handset 171. There is also a transmission path for the receiver R of the handset 171 extending from ground through the receiver R, to contact 157 of relay 150, contact 118 of relay 110, the secondary of transformer T1 and contact 120 of relay 110 to ground. Transformer T1 couples the incoming information from the receive line by way of contacts 101 and 102 and the primary of transformer T1 to the secondary of transformer T1 and on to the receiver R of the handset 171.

5.3 *Data communication.*—When all necessary voice communication is concluded and data is to be transmitted, the operator at each substation will place the handset 171 on the special data pod for data transmission. The handset 171 has therein a magnet 172 which when the handset is placed on the data pod operates the data switch contact 173 contained in the data pod. The closure of contacts 173 extends a ground through the hook-switch contact 170 and the data switch contact 173 to energize relay 110; battery being connected to the other side of the relay. Relay 110 operates breaking contacts 111, 116, 118, 120, 121, 122, 124, and 126 and making contacts 112, 113, 115, 117, 119, 123, 125, and 127. The closing of contact 112 extends the −150 volts through contact 151 of relay 150 to the flasher circuit 139 to the data lamp 146 to ground and the data lamp will flash. At the same time the opening of contact 111 removes the −150 volts to extinguish the voice lamp 145. The opening of contact 116 removes the ground from the transmitter T of the handset 171 and thereby prevents voice communications in the data mode. The transfer from contact 118 to 117 and from contact 120 to 119 disconnects the circuit from the receiver R of the handset 171 and closes the receiving communication path from the secondary of transformer T1 through contact 117, equalizer 129, contact 113 of relay 130, ringback 136, contact 132 of relay 130, the data receive conductor 175, the data set DS, conductor 176, contact 119 of relay 110 and back to the secondary of transformer T1. The transfer from contacts 124 to 123 and 126 to 125 similarly connect the primary of transformer T2 and therefore the transmitting line to the data set DS by way of conductors 177 and 178. The opening of contacts 121 and 122 remove the bust-back pad 137 from bridging the conductors 175, 176, 177 and 178. Closure of contact 127 partially completes the ground circuit for relay 130. Now that the proper connections have been made for data transmission and the substation apparatus has been conditioned from the voice mode to the data mode, data transmission may now take place. Relay 130 is particularly important at this point in that it operates from a ground in the data set DS every time data is received. Receiving this ground, relay 130 operates and opens contacts 133, 134 and 135, and closes contact 131 which in turn opens contact 132. This opens the circuit to the tone detector apparatus 108, removes the ring pad from the receive circuit, and connects the receive circuit straight through the equalizer 129, 5.4 *Re-ring operation.*—Suppose now that either the calling or the called party suspects that a data being transmitted is faulty or garbled. At this time either of the parties may signal the other party to return to voice communication. This is done by removing the handset 171 from the data pod, therefore removing the magnetic circuit between the magnet 172 and the data switch contacts 173. The data switch contacts 173 open and remove the ground from relay 110, deenergizing the relay and returning its contacts 111 to 127 to their normal position. The data lamp 146 will be extinguished by the transfer from contact 112 to 111 and the voice lamp 145 will then light. The transfer at contacts 117–118, 119–120, 123–124, and 125–126 remove the data set DS from the transmitting and receiving lines and reconnect the handset transmitter T and receiver R to the circuit. The substation apparatus has now been transferred from the data mode to the voice mode of operation.

The subset apparatus, now being conditioned to the voice mode, is also conditioned to signal the other party to return to the voice mode. Pushing the ring key 179, that is, moving the contact from 168 and 167 connects a ground by way of contact 167, the re-ring oscillator, closed contact 155 of relay 150, closed contact 126 of relay 110 the primary of transformer T2, and close contact 124 of relay 110 to ground, thereby coupling the output of the re-ring oscillator to the transmission line to signal the other party to return to the voice mode. When the subscriber went from the data mode to the voice mode contact 127 opened de-energizing relay 130 and allowing the contacts 131–135 to return to their normal position and interrupted the data transmission. When data transmission is interrupted, a data set will remove the ground from a station relay 130 that is receiving data. In such a situation the party that is being signalled will have its relay 130 de-energized by the loss of this ground and its associated contacts will return to their normal position as just described. The tone transmitted from the re-ring oscillator will then be coupled by way of transformer T1 through conductors 100, 100' and contacts 135 and 134 of relay 130 in the signalled substation apparatus to energize the tone detecting apparatus 108. The tone ringer 165 will operate and the transducer 166 will sound as previously described. The signalled party, knowing that he is being signalled to return to the voice mode will remove his handset 171 from the data pod breaking the magnetic circuit between the data switch contacts 173 and the handset magnet 172 de-energizing his relay 110 and returning his set to the voice mode. Voice communication may again take place as previously described.

5.5 *Incoming call.*—Suppose now that the substation apparatus as shown in FIG. 2 is the substation apparatus SAN of subscriber station SSN and that the station is in the disconnect mode. No communication, either voice or data has taken place. Assume that substation SSN is the called party and that the switching apparatus SE of switching center SC (FIG. 1) has properly accessed substation SSN. The tone signal generator TRG of the switching center SC transmits a tone to the substation apparatus SAN which is received at the terminals 101 and 102. The tone is coupled through transformer T1 and to the tone detector apparatus 108 by way of conductors 100, 100' and the contacts 134, 135 of relay 130. The tone detector apparatus detects the tone, places the ground on contact 109 and extends this ground through the terminals A1, A2, the contact 115 of relay 110 to the tone ringer 165, which in turn causes the sound transducer 166 to emit the ringing tone. Further operation of the substation apparatus is similar to that previously described in 5.1 to 5.4.

The substation apparatus may be modified, for example an extension unit by placing additional break make contacts on the relays 110 and 150 and connecting at A1, A2 by removing the strap. Also, the equalizer 129 may be shunted when it is not required; the D.C. to tone converter may be removed when it is not required; and the resistance 147 may be shunted for use on long lines.

Other changes, not specifically described herein, may be made by one skilled in the art without departing from the spirit and scope of the invention and should be included in the appended claims.

What is claimed is:

1. In a communication system, a central switching office including switching means operated in response to voice-frequency address signals and means for generating an acknowledgment tone operated in response to the receipt of a voice-frequency address, a substation including voice-frequency signalling apparatus for providing said address signals, a normally disabled transmitter for providing voice transmission, and means comprising tone detecting means and relay means controlled by said tone detecting means to enable said transmitter and disable said voice-frequency signalling apparatus in response to said acknowledgment tone.

2. In a communication system, the combination as claimed in claim 1, wherein said switching office further includes other tone generating means for extending ringing signals to said substation, said acknowledgment tone and said ringing tone being of substantially the same frequency whereby said tone detecting apparatus is also operated in response to said ringing signals; and wherein said substation further includes tone ringing apparatus operated in response to the operation of said tone detecting apparatus.

3. In a communication system, the combination as claimed in claim 2, wherein said relay means has self-locking contacts and wherein said transmitter enabling means further comprises diode means interposed between said self-locking contacts and said tone ringing apparatus to prevent feedback from operating said tone ringing apparatus.

References Cited by the Examiner

UNITED STATES PATENTS

| | | | |
|---|---|---|---|
| 2,041,964 | 5/1936 | Sandalls | 179—6.3 |
| 3,064,084 | 11/1962 | Meacham | 179—90.3 |
| 3,084,213 | 4/1963 | Lemelson | 178—6.6 |

DAVID G. REDINBAUGH, *Primary Examiner.*

J. T. STRATMAN, *Assistant Examiner.*